(12) United States Patent  
Oda et al.

(10) Patent No.: US 11,610,062 B2  
(45) Date of Patent: Mar. 21, 2023

(54) LABEL ASSIGNMENT MODEL GENERATION DEVICE AND LABEL ASSIGNMENT MODEL GENERATION METHOD

(71) Applicant: HITACHI, LTD., Tokyo (JP)

(72) Inventors: Takuya Oda, Tokyo (JP); Michiko Tanaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 280 days.

(21) Appl. No.: 17/072,268

(22) Filed: Oct. 16, 2020

(65) Prior Publication Data

US 2021/0303789 A1 Sep. 30, 2021

(30) Foreign Application Priority Data

Mar. 25, 2020 (JP) .............................. JP2020-054490

(51) Int. Cl.
```
G06F 40/284    (2020.01)
G06N 20/00     (2019.01)
G06F 40/205    (2020.01)
G06F 18/214    (2023.01)
```
(52) U.S. Cl.
CPC ........ *G06F 40/284* (2020.01); *G06F 18/2155* (2023.01); *G06F 40/205* (2020.01); *G06N 20/00* (2019.01)

(58) Field of Classification Search
None
See application file for complete search history.

(56) References Cited

U.S. PATENT DOCUMENTS

| 10,423,650 | B1* | 9/2019 | Moon ................. G06F 16/3346 |
| 2006/0123000 | A1* | 6/2006 | Baxter .................... G06F 16/30 707/999.005 |
| 2008/0004865 | A1* | 1/2008 | Weng .................. G06K 9/6228 704/9 |
| 2010/0125540 | A1* | 5/2010 | Stefik ...................... G06F 16/00 706/12 |
| 2014/0201180 | A1* | 7/2014 | Fatourechi ............ G06F 16/951 707/706 |

(Continued)

FOREIGN PATENT DOCUMENTS

| JP | 2019160236 A | * | 9/2019 |
| JP | 2019160236 A | | 9/2019 |

*Primary Examiner* — Anne L Thomas-Homescu  
(74) *Attorney, Agent, or Firm* — Mattingly & Malur, PC

(57) ABSTRACT

A label assignment model generation device extracts a plurality of feature amounts for a word from a document as an extraction source, and generates, based on an appearance frequency of each of the extracted feature amounts, a label assignment model that is a machine learning model and assigns a label to a word included in a document as an assignment target. The label assignment model generation device adjusts a degree of influence of the feature amount on the label assignment model based on a deviation of the appearance frequency of each of the plurality of feature amounts. The label assignment model generation device extracts a plurality of feature amounts for a word from a remaining document excluding a predetermined document from a plurality of documents as extraction sources, and generates the label assignment model based on the appearance frequency of the extracted feature amounts.

13 Claims, 13 Drawing Sheets

(56) References Cited

U.S. PATENT DOCUMENTS

| | | | |
|---|---|---|---|
| 2015/0309987 A1* | 10/2015 | Epstein | G06F 40/30 |
| | | | 704/9 |
| 2019/0349320 A1* | 11/2019 | Karuppusamy | H04L 51/02 |
| 2020/0184278 A1* | 6/2020 | Zadeh | G06K 9/6264 |
| 2020/0320409 A1* | 10/2020 | Aikoh | G06N 20/00 |
| 2021/0110203 A1* | 4/2021 | Cope | G06V 10/774 |
| 2021/0149989 A1* | 5/2021 | Fox | G06F 40/216 |
| 2021/0191981 A1* | 6/2021 | Deibler | G06K 9/6263 |
| 2021/0240776 A1* | 8/2021 | Jawagal | G06N 3/0454 |

* cited by examiner

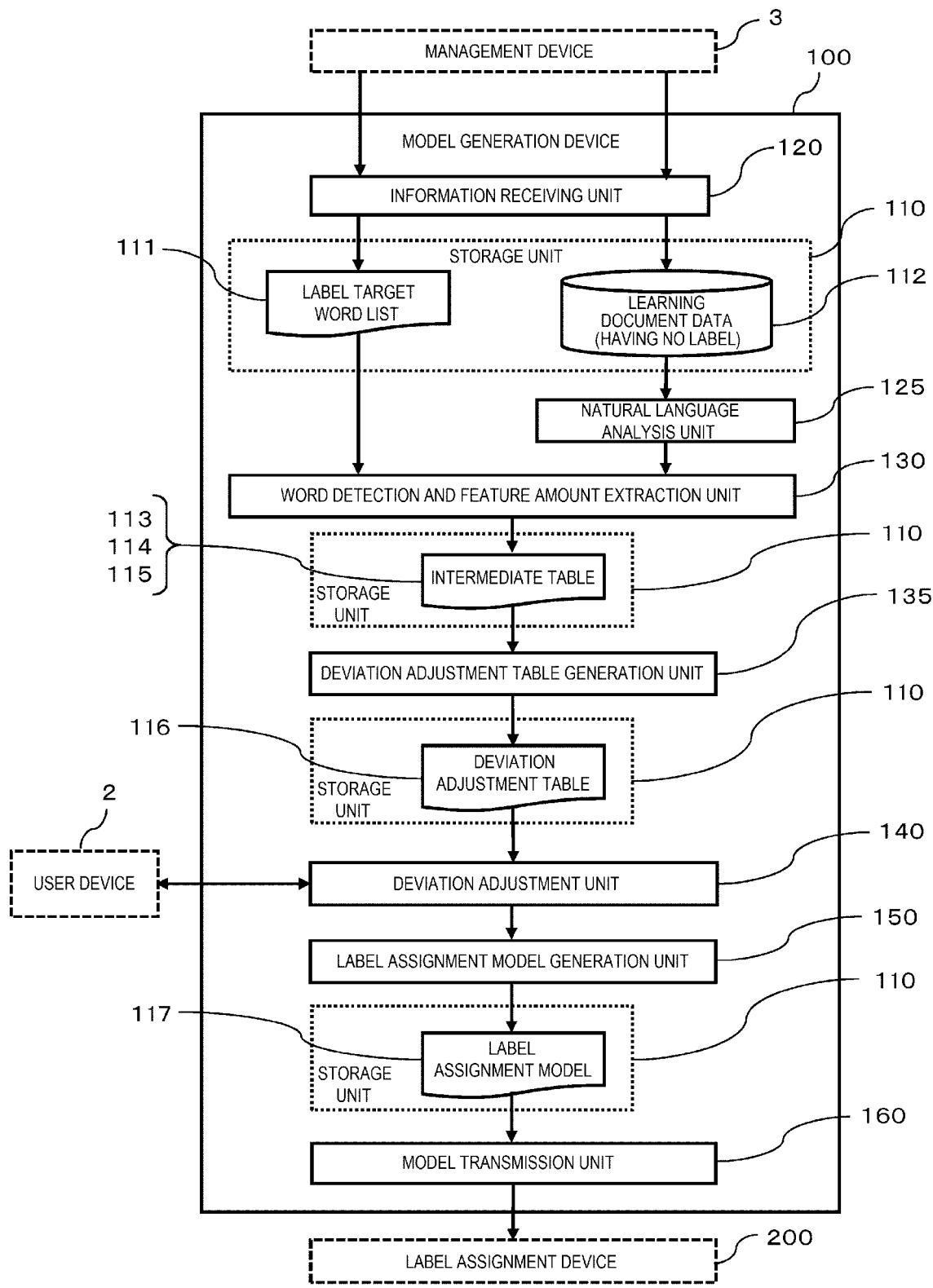

FIG. 5

LABEL TARGET WORD LIST 111

| LABEL ID | LABEL | WORD ID | WORD |
|---|---|---|---|
| L0001 | MACHINE TOOL | 0001 | LATHE |
| | | 0002 | MILLING MACHINE |
| | | : | : |
| | | : | : |
| L0002 | CONTROL DEVICE | 1001 | NC DEVICE |
| | | 1002 | RELAY DEVICE |
| | | : | : |
| : | : | : | : |

Columns: 1111, 1112, 1113, 1114

FIG. 6

FEATURE AMOUNT TABLE 113

| LABEL ID | DOCUMENT ID | PAGE NUMBER | SENTENCE ID | WORD ID | WORD | FEATURE AMOUNT ID | FEATURE AMOUNT |
|---|---|---|---|---|---|---|---|
| L0001 | D0001 | 0002 | 0003 | 0001 | M PROCESSING MACHINE | F0001 | TERMINAL CHARACTER = "MACHINE" |
| L0001 | D0001 | 0002 | 0018 | 0001 | M PROCESSING MACHINE | F0002 | START CHARACTER = "M" |
| L0001 | D0001 | 0005 | 0006 | 0002 | CUTTING MACHINE | F0003 | "STOP" ∈ NEXT 3 WORDS |
| : | : | : | : | : | : | : | : |

Columns: 1131, 1132, 1133, 1134, 1135, 1136, 1137, 1138

FIG. 7

FEATURE AMOUNT DEVIATION TABLE                114

| LABEL ID | DOCUMENT ID | FEATURE AMOUNT ID | NUMBER OF TIMES OF APPEARANCE | FEATURE AMOUNT DEVIATION |
|---|---|---|---|---|
| L0001 | D0001 | F0001 | 5000 | +4940 |
| L0001 | D0001 | F0002 | 10 | −50 |
| L0001 | D0001 | F0003 | 5 | −55 |
| ⋮ | ⋮ | ⋮ | ⋮ | ⋮ |

WORD NUMBER DEVIATION TABLE                115

| LABEL ID | DOCUMENT ID | FEATURE AMOUNT ID | WORD ID | HIT NUMBER | WORD NUMBER DEVIATION |
|---|---|---|---|---|---|
| L0001 | D0001 | F0001 | 0001 | 80 | −75 |
| L0001 | D0001 | F0001 | 0002 | 3 | −2 |
| L0001 | D0001 | F0001 | 0003 | 5 | 0 |
| ⋮ | ⋮ | ⋮ | ⋮ | ⋮ | ⋮ |

DEVIATION ADJUSTMENT TABLE  116

| LABEL ID | DOCUMENT ID | FEATURE AMOUNT ID | WORD ID | FEATURE AMOUNT DEVIATION (a) | FEATURE AMOUNT WEIGHT (b) | WORD NUMBER DEVIATION (c) | WORD NUMBER WEIGHT (d) | SCORE (= a×b+c×d) |
|---|---|---|---|---|---|---|---|---|
| L0001 | D0001 | F0001 | 0001 | +4940 | 0.001 | 80 | 0.1 | 12.94 |
| L0001 | D0001 | F0001 | 0002 | +4940 | 0.001 | 3 | 1.0 | 7.94 |
| L0001 | D0001 | F0001 | 0003 | +4940 | 0.001 | 5 | 1.0 | 9.94 |
| L0001 | D0001 | F0002 | 0004 | −50 | 0.1 | 4 | 1.0 | 9.00 |
| L0001 | D0001 | F0002 | 0005 | −50 | 0.1 | 3 | 1.0 | 8.00 |
| L0001 | D0001 | F0002 | 0006 | −50 | 0.1 | 5 | 1.0 | 10.00 |
| : | : | : | : | : | : | : | : | : |

LABEL ASSIGNMENT MODEL 117

| LABEL ID | LABEL | FEATURE AMOUNT ID | FEATURE AMOUNT | SCORE |
|---|---|---|---|---|
| L0001 | MACHINE TOOL | F0001 | TERMINAL CHARACTER = "MACHINE" | 0. 3024 |
| | | F0002 | START CHARACTER = "M" | 0. 0901 |
| | | F0003 | "STOP" ∈ NEXT 3 WORDS | 0. 0025 |
| | | : | : | : |
| L0002 | CONTROL DEVICE | : | : | : |
| : | | : | : | : |

FIG. 14

WORD AND FEATURE AMOUNT TABLE 213

| WORD | FEATURE AMOUNT |
|---|---|
| M PROCESSING MACHINE | TERMINAL CHARACTER = "MACHINE" |
| | START CHARACTER = "M" |
| CUTTING MACHINE | "STOP" ∈ NEXT 3 WORDS |
| ⋮ | ⋮ |

WORD AND LABEL TABLE 214

| WORD | LABEL |
|---|---|
| M PROCESSING MACHINE | MACHINE TOOL |
| CUTTING MACHINE | MACHINE TOOL |
| ⋮ | ⋮ |

2141  2142

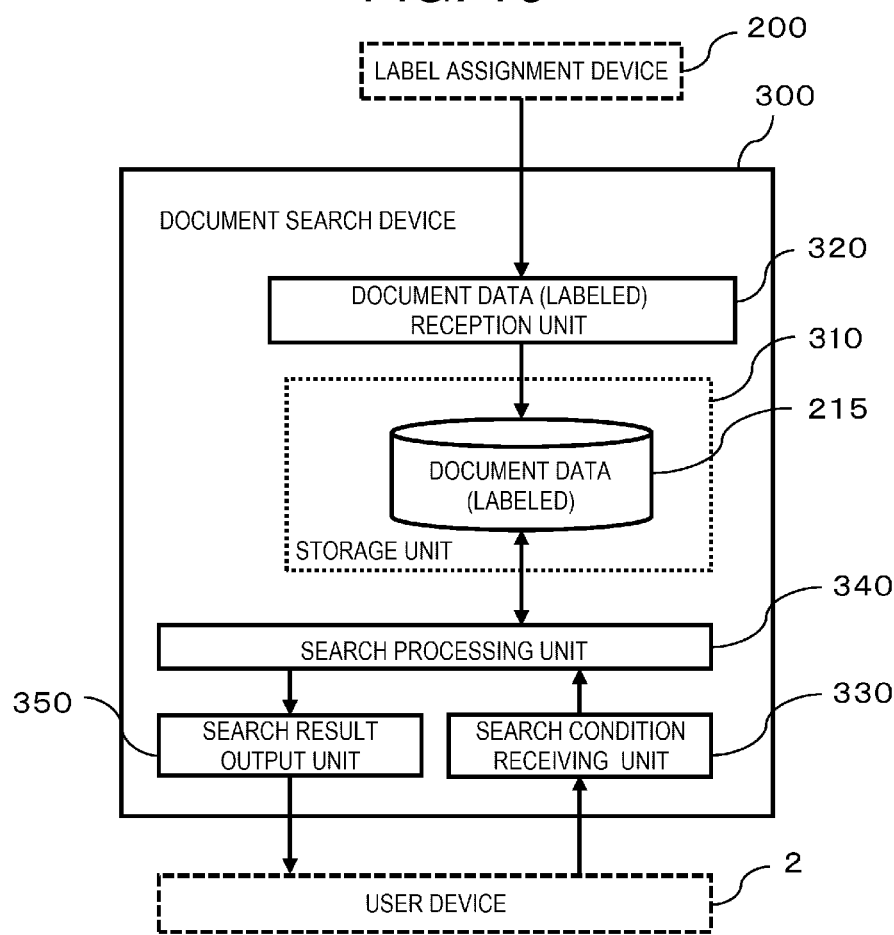

LABEL ASSIGNMENT MODEL GENERATION DEVICE AND LABEL ASSIGNMENT MODEL GENERATION METHOD

CROSS-REFERENCE TO RELATED APPLICATION

This application claims priority pursuant to 35 U.S.C. § 119 from Japanese Patent Application No. 2020-054490, filed on Mar. 25, 2020, the entire disclosure of which is incorporated herein by reference.

BACKGROUND OF THE INVENTION

1. Field of the Invention

The present disclosure relates to a label assignment model generation device and a label assignment model generation method.

2. Description of the Related Art

JP-A-2019-160236 (PTL 1) discloses a learning data generation method for generating learning data of a classifier for classifying names included in a document. In the learning data generation method, a computer executes extraction processing, evaluation processing, and replacement processing. In the extraction processing, a feature element included in a discrimination candidate is extracted for the learning data in which a positive example or a negative example is assigned to the discrimination candidate of the name related to the classification. In the evaluation processing, a degree of deviation of the extracted feature element in the positive example or the negative example is evaluated. In the replacement processing, a name of the discrimination candidate is replaced with another name stored in a storage unit in association with the name according to the evaluated degree of deviation.

As disclosed in PTL 1, for the purpose of improving search accuracy in a document search, a label is assigned to a word included in the document as a search target. In order to efficiently assign the label, it is effective to use a machine learning model, but in this case, it is necessary to prepare learning data having good quality in order to ensure accuracy of the model.

In PTL 1, the feature element included in the discrimination candidate is extracted for the learning data in which the positive example or the negative example is assigned to the discrimination candidate of the name related to the classification, the degree of deviation of the extracted feature element in the positive example or the negative example is evaluated, and the name of the determination candidate is replaced with another name stored in the storage unit in association with the name according to the evaluated degree of deviation.

However, PTL 1 does not consider a deviation of a word number when there are a plurality of words having a common feature element, which is a factor that may affect characteristics of the classifier.

SUMMARY

The invention is made in view of the above circumstances, and an object thereof is to provide a label assignment model generation device and a label assignment model generation method that are capable of assigning an appropriate label to a word included in a document.

One of the inventions for achieving the above object is a label assignment model generation device which is implemented using an information processing device. The label assignment model generation device includes: a model generation unit configured to extract a plurality of feature amounts for a word from a document as an extraction source, and to generate, based on an appearance frequency of each of the extracted feature amounts, a label assignment model that is a machine learning model and assigns a label to a word included in a document as an assignment target; and a deviation adjustment unit configured to adjust, when a plurality of words having a common feature amount are present in the document as the extraction source, a degree of influence of the common feature amount on the label assignment model based on a deviation of the number of each of the plurality of words.

Other problems disclosed by the present application and methods for solving such problems will become apparent from the description of embodiments and drawings.

According to the invention, an appropriate label can be assigned to a word included in a document.

BRIEF DESCRIPTION OF DRAWINGS

FIG. 3 is a block diagram showing an example of an information processing device used in a configuration of a document search device or the like.

FIG. 4 is a system flow diagram showing a main function of a model generation device.

FIG. 5 is an example of a label target word list.

FIG. 6 is an example of a feature amount table.

FIG. 7 is an example of a feature amount deviation table.

FIG. 8 is an example of a word number deviation table.

FIG. 9 is an example of a deviation adjustment table.

FIG. 12 is an example of a label assignment model.

FIG. 14 is an example of a word and feature amount table.

FIG. 15 is an example of a word and label table.

FIG. 16 is a system flow diagram showing a main function of the document search device.

DESCRIPTION OF EMBODIMENTS

Figure 1:
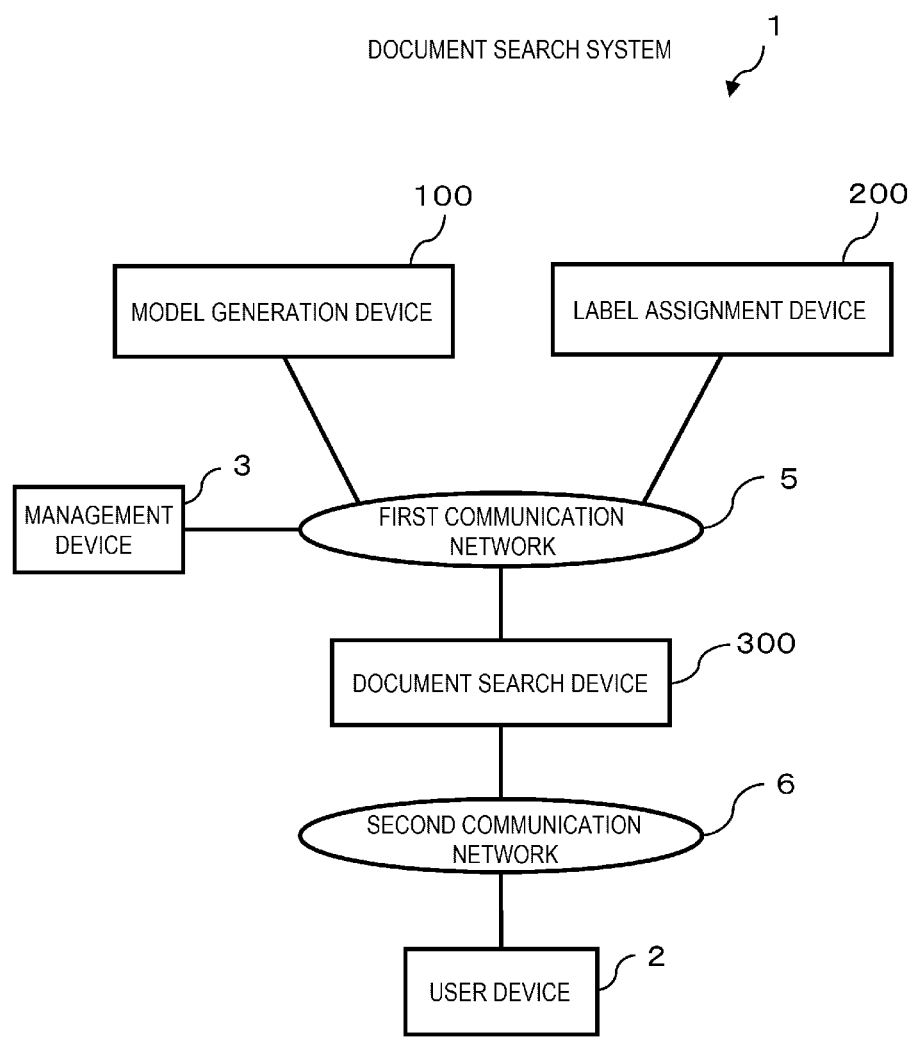
FIG. 1 is a block diagram showing a schematic configuration of a document search system.

Hereinafter, an embodiment will be described with reference to the drawings. In the following description, the same or similar components are denoted by the same reference numerals, and a repetitive description thereof may be omitted. The following description and drawings are examples for describing the invention, and are omitted and simplified as appropriate for clarification of the description. The invention can be implemented in various other forms. Unless otherwise limited, each component may be singular or plural. In the following description, various kinds of information will be described in the expression "table", but various kinds of information may be represented by data structures other than the table. When identification information is described, expressions such as "identifier" and "ID" are appropriately used, and the expressions can be replaced with each other.

FIG. 1 is a diagram showing a schematic configuration of an information processing system (hereinafter referred to as a "document search system 1") shown as an embodiment. As shown in FIG. 1, the document search system 1 includes a model generation device 100, a label assignment device 200, a document search device 300, a user device 2, and a management device 3. Each of these devices is implemented using an information processing device (a computer). All or a part of these devices may be implemented by a common information processing device. For example, the model generation device 100, the label assignment device 200, and the management device 3 may be implemented by a common information processing device. The document search device 300 and the user device 2 may be implemented by a common information processing device.

The model generation device 100, the label assignment device 200, the document search device 300, and the management device 3 are communicably connected via a first communication network 5. The document search device 300 and the user device 2 are communicably connected via a second communication network 6. The first communication network 5 and the second communication network 6 may be a common communication network.

The first communication network 5 and the second communication network 6 are wired or wireless communication infrastructure, and are, for example, a local area network (LAN), a wide area network (WAN), WiFi (registered trademark), the Internet, a dedicated line, and various data communication networks. The first communication network 5 and the second communication network 6 may be a combination of different types of communication infrastructure.

The user device 2 is an information processing device operated by a user who uses the document search device 300. The management device 3 is an information processing device operated by an administrator of the document search system 1. The user and the administrator may be common.

Figure 2:
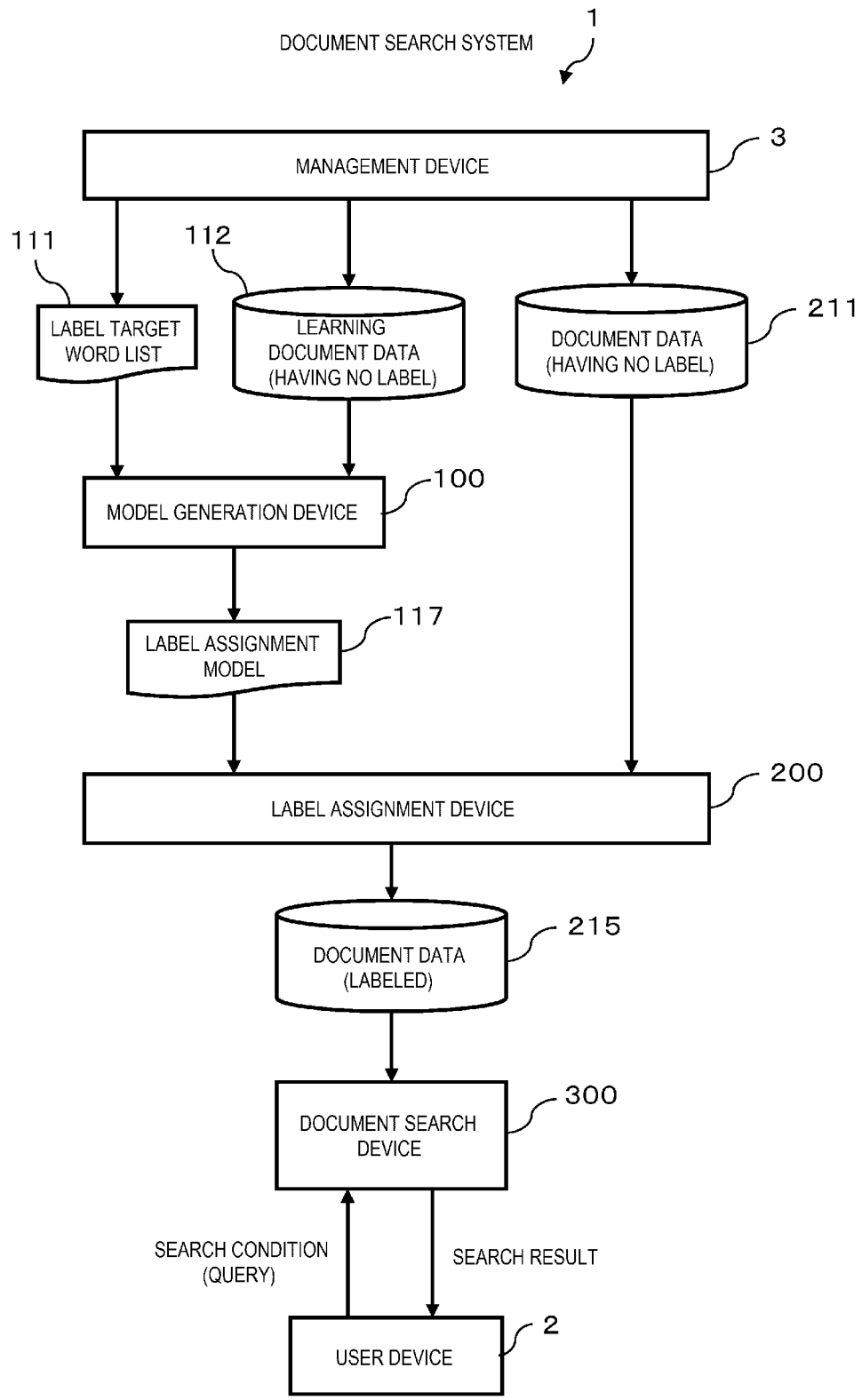
FIG. 2 is a system flow diagram showing a schematic function of the document search system.

FIG. 2 is a system flow diagram showing a schematic function of the document search system 1. As shown in FIG. 2, the document search device 300 executes search processing based on a search condition (query) sent from the user device 2 with document data (labeled) 215 as a search target, and returns a search result to the user device 2. The document data (labeled) 215 is a large number of document groups described in a predetermined data format such as text data.

The document data (labeled) 215 is generated by the label assignment device 200 assigning a label to a word included in document data (having no label) 211 which is the document data that is an assignment target of the label. The label assignment device 200 generates the document data (labeled) 215 to which information associated with the word and the label is attached by assigning the label to the word included in the document data (having no label) 211 using a label assignment model 117. The label assignment model 117 is a machine learning model.

The model generation device 100 is an information processing device that generates the label assignment model 117. The model generation device 100 generates the label assignment model 117 based on a label target word list 111 and the learning document data (having no label) 112. The label target word list 111 is information including a set of the label to be assigned and one or more words which are the assignment target of the label. The learning document data (having no label) 112 is prepared for learning and is the document data as an extraction source of a feature amount. Specifically, for each word in the label target word list 111, for example, the model generation device 100 extracts a feature amount from the learning document data (having no label) 112 by a known feature amount extraction algorithm, and generates a probability model obtained by scoring appearance frequencies of each extracted feature amount in each document as the label assignment model 117.

The label target word list 111 and the learning document data (having no label) 112 are input by the administrator via the management device 3, for example. The label target word list 111 may be created by a person such as the administrator or the user, or may be automatically generated using a known label extraction method (such as a method using a topic model), for example. The latter learning document data (having no label) 112 is, for example, document data of a document related to a business field in which the user of the document search device 300 is engaged.

Figure 3:
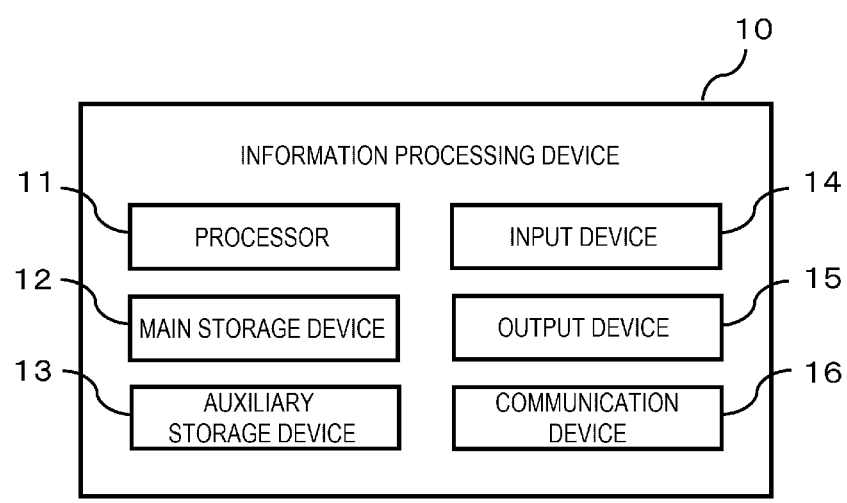

FIG. 3 shows an example of a hardware configuration of the information processing device used for implementing each of the model generation device 100, the label assignment device 200, the document search device 300, the user device 2, and the management device 3. As shown in FIG. 3, an illustrated information processing device 10 includes a processor 11, a main storage device 12, an auxiliary storage device 13, an input device 14, an output device 15, and a communication device 16.

All or a part of the information processing device 10 may be implemented using a virtual information processing resource provided using a virtualization technique, a process space separation technique, or the like, for example, as in a virtual server provided by a cloud system. All or part of functions provided by the information processing device 10 may be implemented by, for example, a service provided by the cloud system via an application programming interface (API) or the like.

The processor 11 includes, for example, a central processing unit (CPU), a micro processing unit (MPU), a graphics processing unit (GPU), a field programmable gate array (FPGA), an application specific integrated circuit (ASIC), and an artificial intelligence (AI) chip or the like.

The main storage device 12 is a device that stores programs and data, and is, for example, a read only memory (ROM), a random access memory (RAM), or a non-volatile memory (a non-volatile RAM (NVRAM)) or the like.

The auxiliary storage device 13 is, for example, a read and write device of a recording medium such as a hard disc drive, a solid state drive (SSD), an optical storage device (such as a compact disc (CD) and a digital versatile disc (DVD)), a storage system, an IC card, an SD card, or an optical recording medium, and a storage domain of a cloud server. A program or data can be read into the auxiliary storage device 13 via a read device of a recording medium or the communication device 16. The program and data stored in the auxiliary storage device 13 are read into the main storage device 12 as needed.

The input device 14 is an interface that receives input from outside, and is, for example, a keyboard, a mouse, a touch panel, a card reader, a pen input type tablet, and a voice input device.

The output device 15 is an interface that outputs various kinds of information such as a processing process or a processing result. The output device 15 is, for example, a display device (such as a liquid crystal monitor, a liquid crystal display (LCD), and a graphic card) that visualizes the various kinds of information above, a device (a sound output device (such as a speaker)) that vocalizes the various kinds of information above, and a device (such as a printing device) that converts the various kinds of information into characters. For example, the information processing device 10 may input information to other devices or output information from other devices via the communication device 16.

The communication device 16 implements communication with other devices. The communication device 16 is a wired or wireless communication interface that implements communication with other devices via the first communication network 5 and the second communication network 6, and is, for example, a network interface card (NIC), a wireless communication module, or a USB module or the like.

For example, an operating system, a file system, a database management system (DBMS) (a relational database, an NoSQL, and the like), a key-value store (KVS), or the like may be introduced to each of the model generation device 100, the label assignment device 200, the document search device 300, the user device 2, and the management device 3.

Functions of the model generation device 100, the label assignment device 200, the document search device 300, the user device 2, and the management device 3 are implemented by the processor 11 reading and executing a program stored in the main storage device 12, or by hardware (such as an FPGA, an ASIC, or an AI chip) constituting these devices.

FIG. 4 is a system flow diagram showing a main function of the model generation device 100. As shown in FIG. 4, the model generation device 100 includes functions of a storage unit 110, an information receiving unit 120, a natural language analysis unit 125, a word detection and feature amount extraction unit 130, a deviation adjustment table generation unit 135, a deviation adjustment unit 140, a label assignment model generation unit 150, and a model transmission unit 160.

The storage unit 110 stores the label target word list 111, the learning document data (having no label) 112, an intermediate table (a feature amount table 113, a feature amount deviation table 114, a word number deviation table 115), a deviation adjustment table 116, and the label assignment model 117. The storage unit 110 stores these pieces of information (data) as, for example, a database table provided by the DBMS or a file provided by the file system.

The information receiving unit 120 receives inputs of the label target word list 111 and the learning document data (having no label) 112 from the administrator via the management device 3, and the storage unit 110 stores the received information.

FIG. 5 shows an example of the label target word list 111. As shown in FIG. 5, the label target word list 111 includes a plurality of entries (records) in which items of a label ID 1111, a label 1112, a word ID 1113, and a word 1114 are associated with one another.

Among the above items, a label ID, which is an identifier of a label to be assigned to a word, is set in the label ID 1111. The label is set in the label 1112. A word ID, which is an identifier of the word, is set in the word ID 1113. The word, which is an assignment target of the label, is set in the word 1114.

Referring back to FIG. 4, the natural language analysis unit 125 divides documents (sentences) included in the learning document data (having no label) 112 into morphemes by executing natural language analysis processing such as a morpheme analysis (a method based on a clause structure model or a probabilistic language model, an analysis based on a point prediction, and the like), and assigns information such as a part of speech to the morphemes so that the word detection and feature amount extraction unit 130 can detect words.

The word detection and feature amount extraction unit 130 detects each word included in the label target word list 111 from the learning document data (having no label) 112, and extracts a feature amount related to each word from the learning document data (having no label) 112 by applying the known feature amount extraction algorithm for each detected word. The feature amount to be extracted is, for example, a prefix or suffix of the word, a word (a co-occurrence word) appearing around the word, or a context or a sentence structure around the word. The above detection and extraction are performed in units of labels and in units of documents. The storage unit 110 stores a result of the extraction as an intermediate table (the feature amount table 113, the feature amount deviation table 114, the word number deviation table 115).

FIG. 6 shows an example of the feature amount table 113 which is one of the intermediate tables. In the feature amount table 113, a result of extracting a feature amount for each word of the label target word list 111 is managed.

As shown in FIG. 6, the feature amount table 113 includes a plurality of entries (records) in which items of a label ID 1131, a document ID 1132, a page number 1133, a sentence ID 1134, a word ID 1135, a word 1136, a feature amount ID 1137, and a feature amount 1138 are associated with one another.

Among the above items, a label ID is set in the label ID 1131. A document ID, which is an identifier of a document (document data), is set in the document ID 1132. A page number in the document is set in the page number 1133. A sentence ID, which is an identifier assigned to each sentence constituting the document, is set in the sentence ID 1134. A word ID is set in the word ID 1135. A word to which the label is assigned is set in the word 1136. A feature amount ID, which is an identifier of the feature amount extracted from the document for the word, is set in the feature amount 1137. The feature amount extracted from the document is set in the feature amount 1138.

FIG. 7 shows an example of the feature amount deviation table 114 which is one of the intermediate tables. In the feature amount deviation table 114, a deviation (a deviation of the number of times of appearance of each feature amount extracted for the label in the document) of each feature amount for each label and each document is managed.

As shown in FIG. 7, the feature amount deviation table 114 includes a plurality of entries (records) in which items of a label ID 1141, a document ID 1142, a feature amount ID 1143, the number of times of appearance 1144, and a feature amount deviation 1145 are associated with one another.

Among the above items, a label ID is set in the label ID 1141. A document ID is set in the document ID 1142. A feature amount ID is set in the feature amount ID 1143. The number of times of appearance of the feature amount in the document is set in the number of times of appearance 1144. The deviation (the deviation of the number of times of appearance of each feature amount extracted for the label in the document, and hereinafter, referred to as a "feature amount deviation") of each feature amount for the label and the document is set in the feature amount deviation 1145. In this example, a reference value of the feature amount deviation is set to "60". In the present embodiment, the number of times of appearance 1144 is used as an index indicating a degree of influence of the feature amount on the label assignment model 117, but the degree of influence of the feature amount may be a value based on other factors (for example, a degree of similarity between words and co-occurrence words that are used in the extraction of the feature amount).

FIG. 8 shows an example of the word number deviation table 115 which is one of the intermediate tables. In the word number deviation table 115, a deviation (a deviation of a hit number of each word of the label having the feature amount in the document) of a word number for each label, each document, and each feature amount is managed.

As shown in FIG. 8, the word number deviation table 115 includes a plurality of entries (records) in which items of a label ID 1151, a document ID 1152, a feature amount ID 1153, a word ID 1154, a hit number 1155, and a word number deviation 1156 are associated with one another.

Among the above items, a label ID is set in the label ID 1151. A document ID is set in the document ID 1152. A feature amount ID is set in the feature amount ID 1153. A word ID is set in the word ID 1154. The hit number of each word of the label having the feature amount in the document is set in the hit number 1155. A deviation (a deviation of the hit number of each word of the label having the feature amount in the document, and hereinafter, referred to as a "word number deviation") of the hit number of each word is set in the word number deviation 1156. In this example, a reference value of the word number deviation is set to "5".

Referring back to FIG. 4, the deviation adjustment table generation unit 135 generates the deviation adjustment table 116 based on the intermediate table (the feature amount table 113, the feature amount deviation table 114, and the word number deviation table 115).

FIG. 9 shows an example of the deviation adjustment table 116. In the deviation adjustment table 116, a weight (hereinafter, referred to as a "feature amount weight") of the feature amount and a weight (hereinafter, referred to as a "word number weight") of the word number that are set for each label, each document, each feature amount, and each word, and a score that is for each label, each document, each feature amount, and each word and is obtained by reflecting these weights are managed.

As shown in FIG. 9, the deviation adjustment table 116 includes a plurality of entries (records) in which items of a label ID 1161, a document ID 1162, a feature amount ID 1163, a word ID 1164, a feature amount deviation 1165, a feature amount weight 1166, a word number deviation 1167, a word number weight 1168, and a score 1169 are associated with one another.

Among the above items, a label ID is set in the label ID 1161. A document ID is set in the document ID 1162. A feature amount ID is set in the feature amount ID 1163. A word ID is set in the word ID 1164.

A value (a feature amount deviation) in the feature amount deviation 1145 in the feature amount deviation table 114 is set in the feature amount deviation 1165. A feature amount weight set for the feature amount (set in units of feature amounts) is set in the feature amount weight 1166. As will be described later, the feature amount weight can also be manually adjusted by the administrator. For example, "1.0" is set as a default value in the feature amount deviation 1165.

A value (a word number deviation) in the word number deviation 1156 in the word number deviation table 115 is set in the word number deviation 1167. A word number weight set for the word of the feature amount (set in units of words) is set in the word number weight 1168. As will be described later, the word number weight can also be manually adjusted by the administrator. For example, "1.0" is set as a default value in the word number deviation 1167.

In the score 1169, a value (hereafter, referred to as a "score") obtained from a×b+c×d is set with a value in the feature amount deviation 1165 being "a", a value in the feature amount weight 1166 being "b", a value in the word number deviation 1167 being "c", and a value in the word number weight 1168 being "d". The score is used to generate the above probability model (the label assignment model).

Referring back to FIG. 4, the deviation adjustment unit 140 adjusts contents of the deviation adjustment table 116. The deviation adjustment unit 140 first determines whether the adjustment is necessary for each label based on the next determination criteria (determination conditions).

Determination criterion 1: Are a plurality of words having a common feature amount in the document as the extraction source present and is a large deviation in the number of the plurality of words present? (Among the words having the common feature amount, is a word whose word number deviation exceeds a first threshold value (hereinafter, referred to as a "specific word") present at a rate of equal to or less than a second threshold value?)

Determination criterion 2: Is a large deviation in an appearance frequency of each of the plurality of feature amounts present? (Is a feature amount (hereinafter, referred to as a "specific feature amount") whose feature amount deviation exceeds a third threshold value present at a rate of equal to or less than a fourth threshold value?)

It is assumed that each threshold value in each of the above determination criteria is set in advance by the administrator, for example. Subsequently, if a label satisfying any of the above determination criteria is present, the deviation adjustment unit 140 adjusts the contents of the deviation adjustment table 116 for the label using any one of the following methods.

Adjustment method 1: Excluding the document that is a factor satisfying any one of the determination criteria and regenerating the deviation adjustment table 116. In the case of the determination criterion 1, the document that is the factor is, for example, a document as an extraction source of the specific word, and in the case of the determination criterion 2, the document that is the factor is, for example, a document as an extraction source of the specific feature amount.

Adjustment method 2: Adjusting the word number weight of words having a common feature amount for the label satisfying the determination criterion 1 (for example, reducing the word number weight of the above specific word).

Adjustment method 3: Adjusting the feature amount weight of the extracted feature amounts for the label satisfying the determination criterion 2 (for example, reducing the feature amount weight of the above specific feature amount).

The adjustment of the deviation adjustment table 116 described above may be automatically executed by software, for example. For example, as described below, the contents of the deviation adjustment table 116 may be adjusted by an interactive process with the administrator.

Figure 10:
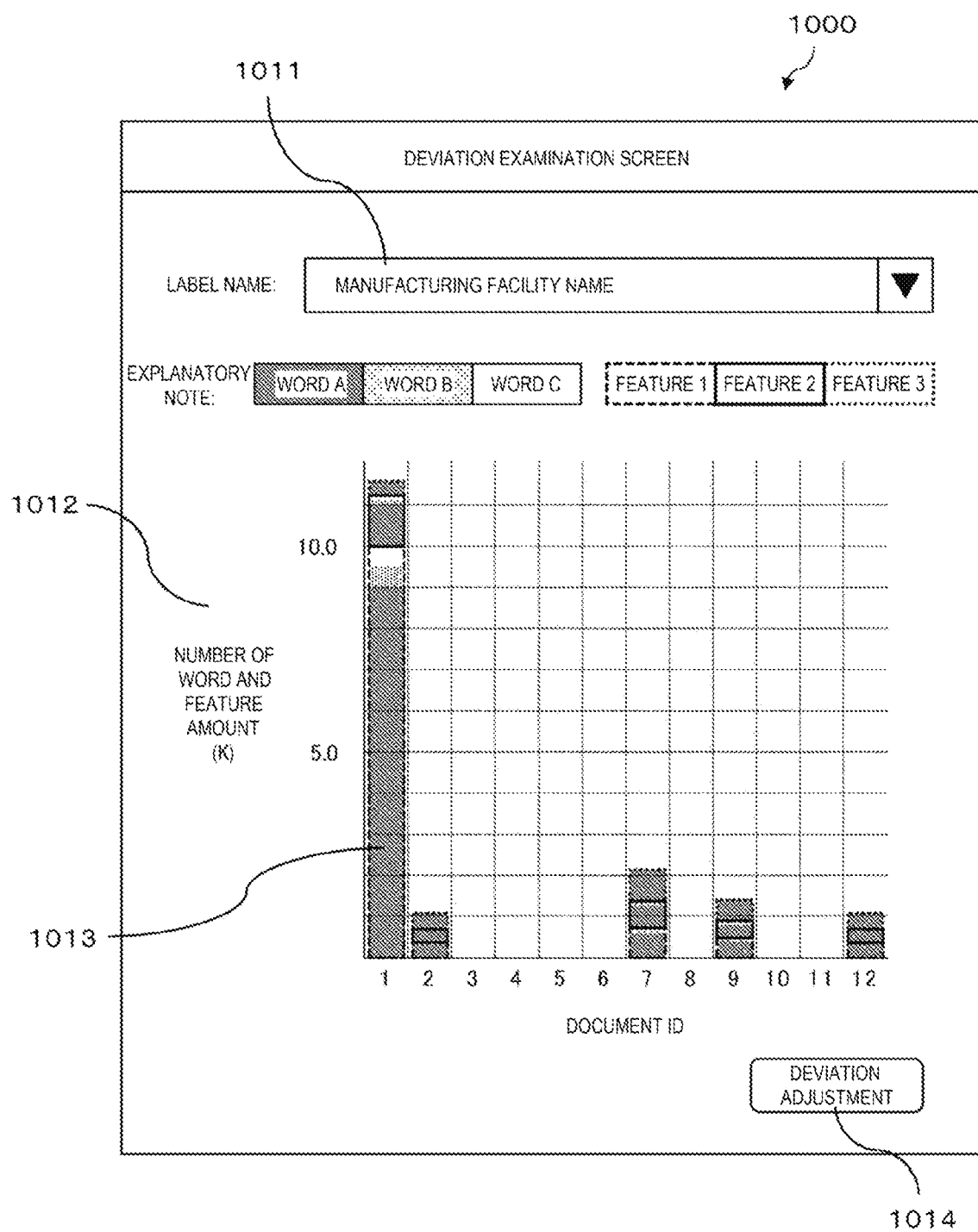
FIG. 10 is an example of a deviation examination screen.

FIG. 10 is an example of a screen (hereinafter, referred to as a "deviation examination screen 1000") displayed on the management device 3 by the deviation adjustment unit 140 when the deviation adjustment unit 140 adjusts the deviation adjustment table 116 by the interactive process. As shown in FIG. 10, the illustrated deviation examination screen 1000 includes a label designation field 1011, a word number and feature amount deviation display field 1012, and a deviation adjustment button 1014.

In the label designation field 1011, the administrator designates a label of the deviation adjustment table 116 for which the contents are to be examined. Hereinafter, the label that has been designated will be referred to as a "designated label".

The contents of the deviation adjustment table 116 for the designated label is visually displayed in the word number and feature amount deviation display field 1012. In this example, in the word number and feature amount deviation display field 1012, a bar graph 1013 indicating the word number detected or the number of feature amounts extracted from each of the contents of the deviation adjustment table 116 for each document (document ID) is displayed. In each bar graph 1013, the appearance frequency of each of the plurality of extracted feature amounts for each document and the number of words having the feature amounts are visually drawn in areas each corresponding to a respective rate. The administrator can easily grasp states of the word number deviation and the feature amount deviation from the bar graph 1013. For example, in the case of the illustrated bar graph 1013, the administrator can easily grasp that the document having the document ID "1" has a larger feature amount deviation of a "feature amount 1" than other documents, and that the word number deviation of "word A" in the "feature amount 1" in the document having the document ID "1" is larger than deviations of other words in the feature amount. The contents of the deviation adjustment table 116 may be displayed in a table format on the deviation examination screen 1000.

When adjusting the contents in the deviation adjustment table 116, the administrator operates the deviation adjustment button 1014.

Figure 11:
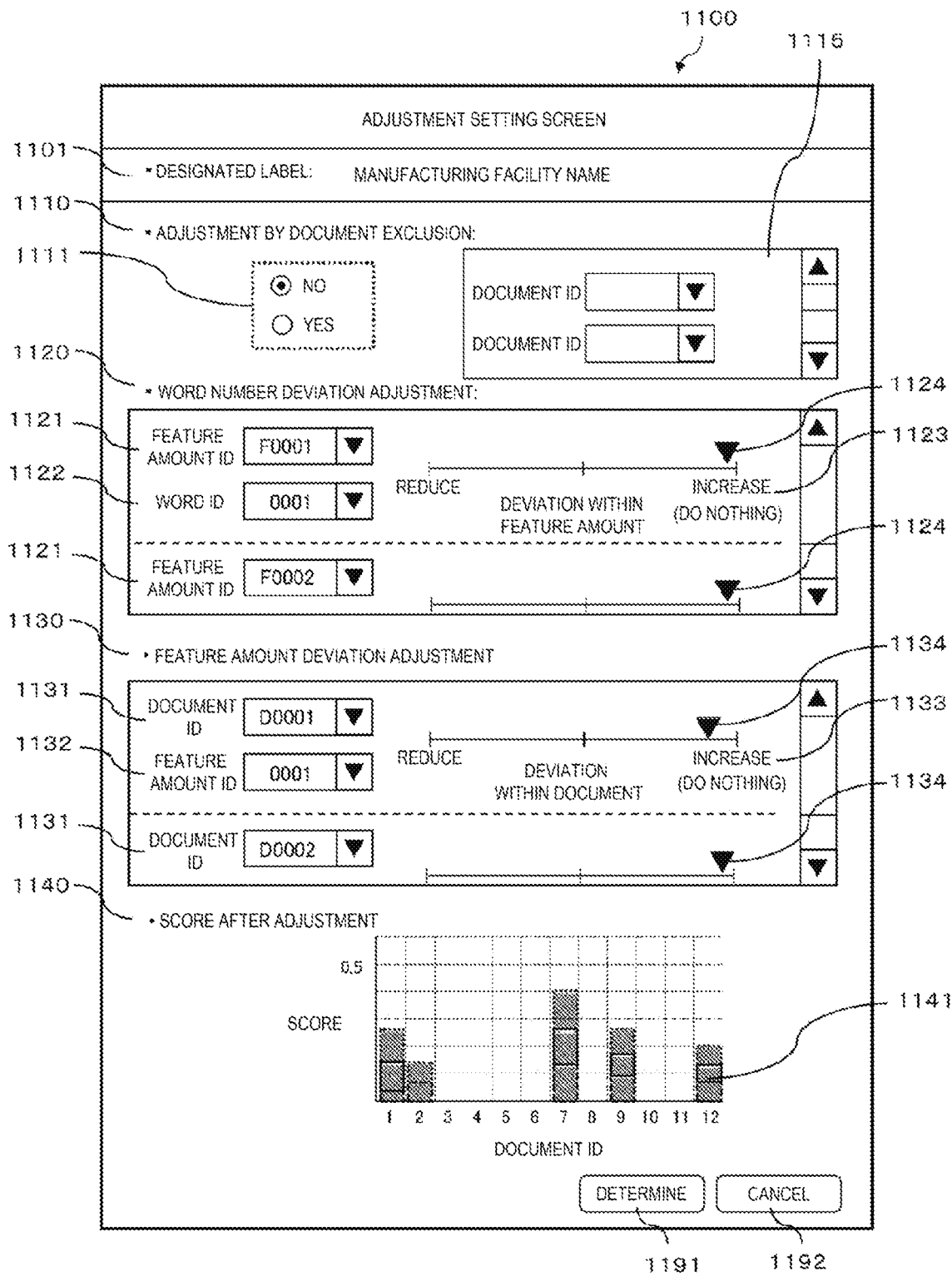
FIG. 11 is an example of an adjustment setting screen.

FIG. 11 is an example of a screen (hereinafter, referred to as an "adjustment setting screen 1100") displayed on the management device 3 by the deviation adjustment unit 140 when the administrator operates the deviation adjustment button 1014. As shown in FIG. 11, the illustrated adjustment setting screen 1100 includes a designated label display field 1101, a document exclusion designation field 1110, a word number deviation adjustment field 1120, a feature amount deviation adjustment field 1130, a score display field 1140, a determination button 1191, and a cancel button 1192.

In the designated label display field 1101, a label (a designated label) designated by the deviation examination screen 1000 is displayed.

The document exclusion designation field 1110 is used when the contents of the deviation adjustment table 116 is adjusted by excluding a specific document (when the contents are adjusted using the adjustment method 1 described above). As shown in FIG. 11, the document exclusion designation field 1110 includes an exclusion presence or absence setting field 1111 and a document designation field 1115.

When the contents of the deviation adjustment table 116 is adjusted by excluding the document, the administrator checks "NO" in the document exclusion designation field 1110, and designates the document ID of the document to be excluded using the document designation field 1115. For example, the administrator designates, in the document designation field 1115, a document that is a factor causing a word number deviation exceeding the first threshold value or a document that is a factor causing a feature amount deviation exceeding the third threshold value. A plurality of documents to be excluded can also be designated.

The word number deviation adjustment field 1120 is used when the contents of the deviation adjustment table 116 is adjusted by adjusting the word number deviation (when the contents are adjusted using the adjustment method 2 described above). As shown in FIG. 11, the word number deviation adjustment field 1120 includes a feature amount designation field 1121, a word designation field 1122, and a word number weight adjustment field 1124. The administrator designates a feature amount (a feature amount ID) in the feature amount designation field 1121, designates a word (a word ID) in the word designation field 1122, and designates a word number weight in the feature amount for the word in the word number weight adjustment field 1124. The word number deviation adjustment field 1120 can individually designate an adjustment amount of the word number deviation for each of one or more combinations of the feature amount (the feature amount ID) and the word (the word ID). The word number weight adjustment field 1124 can easily designate the word number weight by sliding an icon 1123 of an inverted triangle. As the icon 1123 is placed to the right, the word number weight increases. When the icon 1123 is placed at a left end, the word number weight is set to "0.0", and when the icon 1123 is placed at a right end, the word number weight is set to "1.0".

The feature amount deviation adjustment field 1130 is used when the contents of the deviation adjustment table 116 is adjusted by adjusting the feature amount deviation (when the contents are adjusted using the adjustment method 3 described above). As shown in FIG. 11, the feature amount deviation adjustment field 1130 includes a document designation field 1131, a feature amount designation field 1132, and a feature amount weight adjustment field 1133. The administrator designates a document (a document ID) in the document designation field 1131, designates a feature amount (a feature amount ID) in the feature amount designation field 1132, and designates a feature amount weight of the feature amount for the document in the feature amount weight adjustment field 1133. The feature amount deviation adjustment field 1130 can individually designate an adjustment amount of the feature amount deviation for each of one or more combinations of the document (the document ID) and the feature amount (the feature amount ID). The feature amount weight adjustment field 1133 can easily designate the feature amount weight by sliding an icon 1134 of an inverted triangle. As the icon 1134 is placed to the right, the feature amount weight increases. When the icon 1134 is placed at a left end, the feature amount weight is set to "0.0", and when the icon 1134 is placed at a right end, the feature amount weight is set to "1.0".

As described above, the administrator can easily and flexibly adjust the contents of the deviation adjustment table 116 using any one of the adjustment methods 1 to 3 and using the adjustment setting screen 1100. Two or more of the document exclusion designation field 1110, the word number deviation adjustment field 1120, and the feature amount deviation adjustment field 1130 may be used in combination at the same time as long as no inconsistency arises in the contents. In that case, a score is calculated after the contents set in each field are applied under an AND (&) condition.

In the score display field 1140 in FIG. 11, a score for each document (document ID) having the label obtained based on the contents designated in the document exclusion designation field 1110, the word number deviation adjustment field 1120, and the feature amount deviation adjustment field 1130 is displayed in a bar graph 1141. In the bar graph 1141, information indicating a degree of contribution of each feature amount and each word in the score is visually displayed.

The contents thus adjusted are reflected in the deviation adjustment table 116 by the deviation adjustment unit 140.

Referring back to FIG. 4, subsequently, the label assignment model generation unit 150 generates the label assignment model 117 based on the deviation adjustment table 116.

FIG. 12 shows an example of the label assignment model 117. The illustrated label assignment model 117 includes a plurality of entries (records) including items of a label ID 1171, a label 1172, a feature amount ID 1173, a feature amount 1174, and a score 1175. The illustrated label assignment model 117 includes a plurality of label assignment models for labels specified by the label ID 1171.

Among the above items, a label ID is set in the label ID 1171. A label is set in the label 1172. A feature amount ID is set in the feature amount ID 1173. A feature amount is set in the feature amount 1174. A value obtained by summing values in the score 1169 in the deviation adjustment table 116 for the feature amount is set in the score 1175.

Referring back to FIG. 4, subsequently, the model transmission unit 160 transmits the generated label assignment model 117 to the label assignment device 200.

Figure 13:
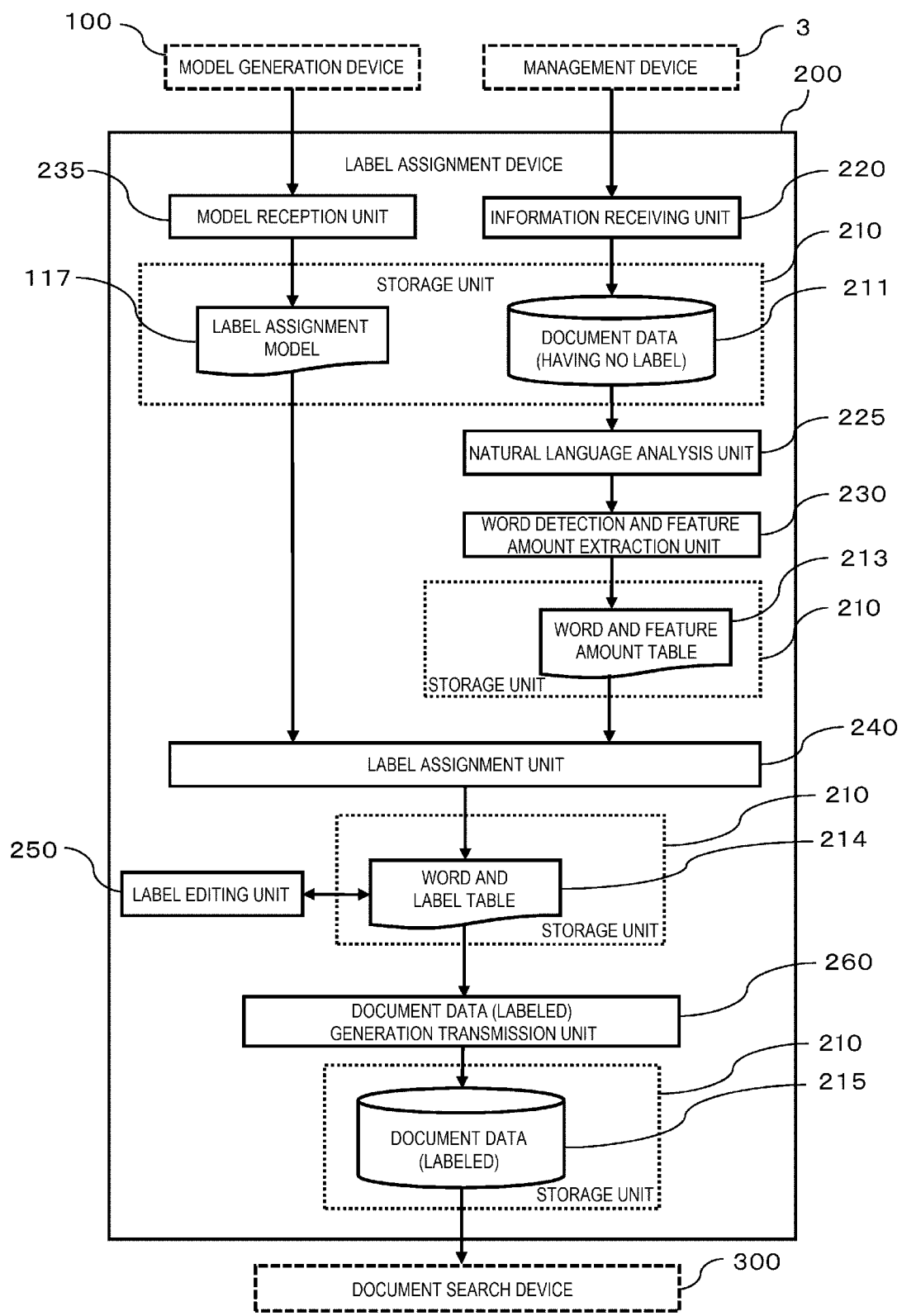
FIG. 13 is a system flow diagram showing a main function of a label assignment device.

FIG. 13 is a system flow diagram showing a main function of the label assignment device 200 shown in FIG. 1. As shown in FIG. 13, the label assignment device 200 includes functions of a storage unit 210, an information receiving unit 220, a natural language analysis unit 225, a word detection and feature amount extraction unit 230, a model reception unit 235, a label assignment unit 240, a label editing unit 250, and a document data (labeled) generation transmission unit 260.

The storage unit 210 stores the document data (having no label) 211, the label assignment model 117, a word and feature amount table 213, a word and label table 214, and the document data (labeled) 215. The storage unit 210 stores these pieces of information (data) as, for example, a database table provided by the DBMS or a file provided by the file system.

The information receiving unit 220 receives the document data (a label assignment target) from the administrator via the management device 3. The storage unit 210 stores the received document data (the label assignment target) as the document data (having no label) 211.

The natural language analysis unit 225 divides documents (sentences) included in the document data (having no label) 211 into morphemes by executing the natural language analysis processing such as the morpheme analysis (the method based on the clause structure model or the probabilistic language model, the analysis based on the point prediction, and the like), and assigns information such as a part of speech to the morpheme so that the word detection and feature amount extraction unit 230 can detect words.

The word detection and feature amount extraction unit 230 detects the words included in the document data (having no label) 211 based on an analysis result obtained by the natural language analysis unit 225, and extracts a feature amount related to the word from the document data (having no label) 211 by, for example, the known feature amount extraction algorithm for the detected words. The feature amount to be extracted is, for example, a prefix or suffix of the word, a word (a co-occurrence word) appearing around the word, or a context or a sentence structure around the word. The storage unit 210 stores the feature amount extracted by the word detection and feature amount extraction unit 230 as the word and feature amount table 213.

FIG. 14 shows an example of the word and feature amount table 213. As shown in FIG. 14, the word and feature amount table 213 includes a plurality of entries (records) having items of a word 2131 and a feature amount 2132. Among the above items, a word detected by the word detection and feature amount extraction unit 230 from the document data (having no label) 211 is set in the word 2131. A feature amount extracted by the word detection and feature amount extraction unit 230 from the document data (having label) 211 is set in the feature amount 2132.

Referring back to FIG. 13, by applying the label assignment model 117 to the word and feature amount table 213, the label assignment unit 240 assigns a label to the word detected from the document data (having no label) 211 by the word detection and feature amount extraction unit 230, and generates a word and label table as data indicating a correspondence between the word and the label. The storage unit 210 stores the word and label table generated by the label assignment unit 240 as the word and label table 214.

For example, when the label assignment model 117 is the contents shown in FIG. 12 and the word and feature amount table 213 is the contents shown in FIG. 14, for "M processing machine" in the word 2131 in the word and feature amount table 213, "Terminal character="machine"" and "Start character="M"" in the feature amount 2132 match the feature amount 1174 of "L0001" in the label ID 1171 of the label assignment model. In this case, the label assignment unit 240 determines whether to set a label for a word "M processing machine" depending on whether a summed value "0.3925" obtained by adding scores "0.3024" and "0.0901" of the label assignment model 117 exceeds a preset threshold value. If the threshold value is exceeded, "machine tool" is set in the label 1172.

FIG. 15 shows an example of the word and label table 214. As shown in FIG. 5, the word and label table 214 includes a plurality of entries (records) having items of a word 2141 and a label 2142. Among the above items, a word detected from the document data (having no label) 211 by the word detection and feature amount extraction unit 230 is set in the word 2141. A label assigned to the word by the label assignment unit 240 is set in the label 2142.

Referring back to FIG. 13, the label editing unit 250 provides the administrator with an editing environment of the word and label table 214 via the management device 3. The administrator can easily adjust contents of the word and label table 214 in an interactive manner using the editing environment.

The document data (labeled) generation transmission unit 260 generates data (the document data (labeled) 215) in which the word and label table 214 is attached to the document data (having no label) 211, and transmits the generated document data (labeled) 215 to the document search device 300.

FIG. 16 is a system flow diagram showing a main function of the document search device 300 shown in FIG. 1. As shown in FIG. 16, the document search device 300 includes functions of a storage unit 310, a document data (labeled) reception unit 320, a search condition receiving unit 330, a search processing unit 340, and a search result output unit 350.

The storage unit 310 stores the document data (labeled) 215. The storage unit 310 stores the document data (labeled) 215 as, for example, a database table provided by the DBMS or a file provided by the file system.

The document data (labeled) reception unit 320 receives the document data (labeled) 215 that is attached with the word and label table 214 and is sent from the label assignment device 200, and the storage unit 310 stores the document data (labeled) 215 together with the word and label table 214.

The search condition receiving unit 330 receives a search condition (a query) input by the user via the user device 2.

The search processing unit 340 searches the document data (labeled) 215 for information corresponding to the search condition (the query). At this time, the search processing unit 340 executes the above search using the word and label table 214 attached to the document data (labeled) 215. For example, when a word is designated as a search condition, information including a word belonging to the same label as the label to which the word belongs is searched from the document data (labeled) 215. By including not only a search word designated by the user as described above but also the word (words belonging to the same category) having the same label as that of the search word designated by the user in a search keyword, a search result based on a multifaceted viewpoint can be provided to the user.

As described above, the document search system 1 according to the present embodiment generates the label assignment model 117 in consideration of the deviation of the number of each word when a plurality of words having a common feature amount are present in the deviation adjustment table 116, so that the label assignment model 117 can be adjusted, for example, according to a mode of the learning document data (having no label) 112 to have the desired performance and accuracy. By generating the document data (labeled) 215 using the adjusted label assignment model 117, for example, it is possible to provide a document search environment conforming to needs of the user who uses the document search device 300.

According to the document search system 1 in the present embodiment, the user can easily adjust the label assignment model 117 using at least one of the adjustment methods 1 to 3 described above and using the adjustment setting screen 1100.

According to the document search system 1 in the present embodiment, the label assignment model 117 can be appropriately learned using less learning data (the learning document data (having label) 112), and an appropriate label can be efficiently assigned to a word included in a huge amount of the document data (having no label) 211.

The embodiment of the invention has been described above. However, the invention is not limited to the above embodiment, and various modifications can be made without departing from the gist of the invention. For example, the embodiment described above has been described in detail for easy understanding of the invention, and the invention is not necessarily limited to those including all the configurations described above. Other configurations can be added to be, eliminated from, or replaced with a part of the configuration of the above-described embodiment.

For example, the document search system 1 according to the present embodiment can be applied to various fields such as search of documents related to past similar cases used for specifying causes when a failure occurs in a system or a device in a railway system, a medical device, a construction machine, or the like, automatic extraction of experimental data available for development of new materials from existing patent documents, and automatic extraction of credit information from documents such as financial statements in a finance field, and it is possible to reduce a search load of various systems and to improve efficiency of search operation.

The above-described configurations, functional units, processing units, processing methods, and the like may be implemented by hardware, and for example, by designing a part or all of the above-described configurations, functional units, processing units, processing methods, and the like with an integrated circuit. The above-described configurations, functions, and the like may be implemented by software and by interpreting and executing programs that implement the functions by a processor. Information such as a program, a table, and a file for implementing each function can be placed in a recording device such as a memory, a hard disk, or a solid state drive (SSD), or in a recording medium such as an IC card, an SD card, or a DVD.

The drawings show control lines and information lines as considered necessary for description but do not necessarily show all control lines and information lines in the products. For example, it may be considered that almost all configurations are connected to one another.

Arrangement forms of various functional units, various processing units, and various databases of the various information processing devices described above are merely examples. The arrangement forms of the various functional units, the various processing units, and the various databases can be changed to optimum arrangement forms from viewpoints of performance, processing efficiency, communication efficiency, and the like of hardware and software that are provided in the various devices.

A configuration (Schema) of the database storing various types of data described above can be flexibly changed from viewpoints of efficient utilization of resources, improvement of processing efficiency, improvement of access efficiency, improvement of search efficiency, and the like.

What is claimed is:

1. A label assignment model generation device implemented using an information processing device, the label assignment model generation device comprising:
   a processor configured to:
   extract a plurality of feature amounts for a word from a document as an extraction source, and to generate, based on an appearance frequency of each of the extracted feature amounts, a label assignment model that is a machine learning model and assigns a label to a word included in a document as an assignment target; and
   adjust, when a plurality of words having a common feature amount are present in the document as the extraction source, a degree of influence of the common feature amount on the label assignment model based on a deviation of the number of each of the plurality of words,
   wherein the processor adjusts the degree of influence of the common feature amount on the label assignment model when a word having the deviation exceeding a preset first threshold value is present at a rate of equal to or less than a second threshold value in the document as the extraction source.

2. The label assignment model generation device according to claim 1, wherein
   the processor reduces the degree of influence of the common feature amount on the label assignment model when the word having the deviation exceeding the preset first threshold value is present at the rate of equal to or less than the second threshold value in the document as the extraction source.

3. A label assignment model generation device implemented using an information processing device, the label assignment model generation device comprising:
   a processor configured to:
   extract a plurality of feature amounts for a word from a document as an extraction source, and to generate, based on an appearance frequency of each of the extracted feature amounts, a label assignment model that is a machine learning model and assigns a label to a word included in a document as an assignment target; and adjust, when a plurality of words having a common feature amount are present in the document as the extraction source, a degree of influence of the common feature amount on the label assignment model based on a deviation of the number of each of the plurality of words, wherein the processor receives a weight of the deviation of the number of each of the words having the common feature amount, the number of each of the words having the common feature amount being input via a user interface, and adjusts the degree of influence of the common feature amount on the label assignment model in accordance with the received weight.

4. The label assignment model generation device according to claim 1, wherein the processor adjusts the degree of influence of the feature amount on the label assignment model based on a deviation of the appearance frequency of each of the plurality of feature amounts.

5. The label assignment model generation device according to claim 4, wherein the processor adjusts the degree of influence of the feature amount on the label assignment model when a feature amount having the deviation of the appearance frequency exceeding a preset third threshold value is extracted at a rate of equal to or less than a fourth threshold value in the document as the extraction source.

6. The label assignment model generation device according to claim 5, wherein the processor reduces the degree of influence of the feature amount on the label assignment model when the feature amount having the deviation of the appearance frequency exceeding the preset third threshold value is extracted at the rate of equal to or less than the fourth threshold value from the document as the extraction source.

7. The label assignment model generation device according to claim 4, wherein the processor receives a weight of the deviation of the appearance frequency of each of the feature amounts, the appearance frequency of each of the feature amounts being input via a user interface, and adjusts the degree of influence of the feature amount on the label assignment model in accordance with the received weight.

8. The label assignment model generation device according to claim 1, wherein the processor extracts the plurality of feature amounts for the word from a plurality of documents as extraction sources, and generates the label assignment model based on the appearance frequency of the extracted feature amounts, and the processor extracts a plurality of feature amounts for a word from a remaining document excluding a predetermined document from the plurality of documents, and generates the label assignment model based on the appearance frequency of the extracted feature amounts.

9. The label assignment model generation device according to claim 8, wherein the processor extracts a plurality of feature amounts for the word from the remaining document excluding the predetermined document from the plurality of documents designated via a user interface, and generates the label assignment model based on the appearance frequency of the extracted feature amounts.

10. The label assignment model generation device according to claim 1, further comprising:

a user interface configured to display a bar graph in which the appearance frequency of each of the plurality of extracted feature amounts and a word number having the feature amounts are visually drawn in areas corresponding to an occupied rate for each document.

11. A label assignment model generation method implemented by an information processing device comprising the steps of:

extracting a plurality of feature amounts for a word from a document as an extraction source, and generating, based on an appearance frequency of each of the extracted feature amounts, a label assignment model that is a machine learning model and assigns a label to a word included in a document as an assignment target;

adjusting, when a plurality of words having a common feature amount are present in the document as the extraction source, a degree of influence of the common feature amount on the label assignment model based on a deviation of the number of each of the plurality of words; and adjusting the degree of influence of the common feature amount on the label assignment model when a word having the deviation exceeding a preset first threshold value is present at a rate of equal to or less than a second threshold value in the document as the extraction source.

12. The label assignment model generation method according to claim 11, further comprising the step of:

adjusting the degree of influence of the feature amount on the label assignment model based on a deviation of the appearance frequency of each of the plurality of feature amounts.

13. The label assignment model generation method according to claim 11, further comprising the steps of:

extracting the plurality of feature amounts for the word from a plurality of documents as extraction sources, and generating the label assignment model based on the appearance frequency of the extracted feature amounts; and extracting a plurality of feature amounts for a word from a remaining document excluding the predetermined document from the plurality of documents, and generating the label assignment model based on the appearance frequency of the extracted feature amounts.

* * * * *